United States Patent [19]

Rosenbaum

[11] Patent Number: 5,012,963

[45] Date of Patent: May 7, 1991

[54] WALKER SUPPORT TOTE BAG

[76] Inventor: Patricia Rosenbaum, 1020 Lees La., Florissant, Mo. 63031

[21] Appl. No.: 414,261

[22] Filed: Sep. 29, 1989

[51] Int. Cl.[5] .............................................. B60R 11/00

[52] U.S. Cl. ................................ 224/42.46 R; 135/67; 206/459; 383/22; 383/38

[58] Field of Search ......................... 224/42.46 R, 227; 135/66, 67, 65; 206/459; 190/109; 150/112; 383/38, 39, 22, 35; 116/DIG. 41

[56] References Cited

U.S. PATENT DOCUMENTS

| | | | |
|---|---|---|---|
| 1,906,500 | 5/1933 | Twitchell | 383/117 |
| 2,515,316 | 7/1950 | Schjelderup | 224/151 |
| 2,761,481 | 9/1956 | Boatwright | 383/22 |
| 3,749,211 | 7/1973 | Cima | 190/109 |
| 4,285,105 | 8/1981 | Kirkpatrick | 206/459 |
| 4,676,416 | 6/1987 | Harmon | 224/901 |

FOREIGN PATENT DOCUMENTS

| | | | |
|---|---|---|---|
| 835030 | 9/1938 | France | 190/109 |

*Primary Examiner*—Linda J. Sholl

*Attorney, Agent, or Firm*—Polster, Polster and Lucchesi

[57] ABSTRACT

A walker support tote bag is disclosed as adapted to be mounted to a walker support for carrying a variety of articles. The tote bag includes a large inner compartment within the tote bag for receiving a variety of articles and outer peripherally spaced pockets along an outer face of the tote bag for receiving articles, generally of smaller size. The outer peripherally spaced pockets have a different contrasting color than the tote bag to aid a user in positioning articles within the pockets. The tote bag and the outer peripherally spaced pockets are made from flexible material to enable the tote bag to be closed and collapsed for carrying and storage purposes. For mounting the tote bag to the walker support, strap elements are attached to the tote bag and are configured, arranged and dimensioned relative to the tote bag to cause the large inner compartment thereof to be continuously maintained in an open position for receipt of a variety of articles therein, as well as to enable the outer peripherally spaced pocket to also receive articles.

8 Claims, 2 Drawing Sheets

WALKER SUPPORT TOTE BAG

BACKGROUND OF THE INVENTION

The present invention relates to a walker support tote bag, and more particularly, to a tote bag which enables a user to facilitate the carrying of a variety of articles within a large compartment within the tote bag, as well as carrying articles within outer peripherally spaced pockets of the tote bag, all while mounted to a walker support.

It is well known that walker supports are used to aid handicapped, injured and/or aged individuals to walk with stability and support. Such walker support devices typically include four spaced supporting legs which are attached to interconnecting handles or cross bars, enabling a person to grasp the interconnecting handles or cross bars while obtaining support from the four spaced supporting legs. Samples of such devices are shown in U.S. Pat. Nos. 3,957,071 and 4,074,683. When using such walker supports, individuals must use both hands in lifting and moving the walker support a short distance forward, allowing the individual to make a step or two toward the walker support, so as to provide stabilized or balanced walking movements.

Although walker supports are indeed necessary to facilitate walking by handicapped, injured and/or aged individuals, they have not generally been provided with the added need/convenience for carrying various articles which the user may desire or require. For example, woman users may not only want to carry their handbags containing personal belongings, but they also may desire to carry a liquid refreshment, personal grooming articles, etc., while at the same time using the walker support. While there have been some devices which have been developed to meet the convenience/need of users in this regard, they have generally fallen short in providing the desired uses/objectives of users.

For example, some walker supports have been provided with wire walker baskets, to aid in carrying various articles for the convenience/need of users. As will be readily appreciated, such wire walker baskets have to be permanently affixed to the walker or walker supports, do not allow various articles to be supported and maintained within separate compartments, and further do not permit various liquid refreshments to be carried, without concern for spilling the contents thereof.

While the prior art shows a variety of different bags containers and the like for use on baby strollers or shopping carts, very little consideration has been given to the development of a walker tote bag to meet the specific needs/conveniences of handicapped, injured or aged individuals. Other than the wire walker baskets referred to above, U.S. Pat. No. 4,676,416, for example, discloses a collapsible and portable walker carrier device which is generally similar to the wire walker basket except that it is readily collapsible and portable. Other than these specific features; however, this patented device does not meet the above and other needs/conveniences of walker support users. Various other types of bags, containers and article carriers have been developed for baby strollers and shopping carts, some of which include an outer pocket or pockets. Examples of such devices are shown in U.S. Pat. Nos. 1,577,298; 3,967,666; 4,186,859; 4,240,480; and 4,795,268. For various and specific reasons which will be explained in substantial detail below, all of the aforementioned patented devices fall short in meeting the needs/conveniences of walker support users.

SUMMARY OF THE INVENTION

Among the several objects and advantages of the present invention include:

The provision of a walker support tote bag which overcomes the aforenoted and other deficiencies of prior art devices;

The provision of a walker support tote bag which includes a large inner compartment for carrying articles and outer peripherally spaced pockets for carrying articles generally of smaller size;

The provision of the aforementioned walker support tote bag which is constructed to be readily collapsible for convenient storage and carrying thereof when unattached to an associated walker support;

The provision of the aforementioned walker support tote bag including strap elements that are configured, arranged and dimensioned with respect to the tote bag to cause the large inner compartment thereof to be continuously maintained in an open position, with the outer peripherallY spaced pockets also opened for ready receipt of articles therein;

The provision of the aforementioned walker support tote bag in which the outer peripherally spaced pockets are constructed from a different contrasting color than the tote bag in order to enable the user to readily distinguish between the pockets and the tote bag itself;

The provision of the aforementioned walker support tote bag in which the various strap elements include releasable snap closure fastening devices to facilitate mounting to and easy removal from the walker support; and The provision of the aforementioned walker support tote bag which is made from a light weight, mesh material that can be readily and economically and efficiently manufactured by well known techniques, thus providing a low cost and economical tote bag which is well adapted for all intended purposes.

Briefly stated, the present invention relates to a tote bag adapted to be mounted to a walker support for carrying a variety of articles. The tote bag includes a large inner compartment for receiving a variety of articles, outer peripherally spaced pocket means attached to an outer face of the tote bag for receiving articles, with the pocket means having a different contrasting color than the tote bag to aid a user in positioning articles within the pocket means, and strap means attached to the tote bag and adapted to be mounted to the walker support for supporting the tote bag on the walker support.

The tote bag, the outer peripherally spaced pocket means and the strap means are all made from flexible material enabling collapse and folding thereof for carrying and storing the tote bag prior to use. The strap means is configured, arranged and dimensioned relative to the tote bag to cause the large compartment thereof to be continuously maintained in an open position when mounted on the walker support. The strap means comprise a plurality of strap elements peripherally spaced about the tote bag so as to exert transverse forces on the tote bag to continuously maintain the large compartment of the tote bag in an open position. The strap means further includes releasable fastening means for releasably securing the tote bag to the walker support.

The tote bag is made from front and back panels of flexible material each having a substantially rectangular configuration with upper, bottom and opposed side marginal edges, the front and back panels being secured to one another along the bottom and opposed side marginal edges thereof so as to maintain the front and back panels in juxtaposition relative to one another when the tote bag is in closed and collapsed position, so as to facilitate carrying and storage of the tote bag to use on the walker support. The tote bag is manually openable along the upper marginal edges of the front and back panels to provide a large compartment within the tote bag for carrying articles. The strap means are attached to the front and back panels and are configured, arranged and dimensioned relative to the tote bag for causing the front and back panels to be maintained in continuously spaced relationship from one another for storage of articles within the large compartment of the tote bag when mounted on the walker support.

The strap means includes spaced intermediate strap elements attached to the front and back panels each extending from the upper marginal edge of one panel to and through the attached bottom marginal edges of the panels to the upper marginal edge of the other panel in order to reinforce the flexible material from which the panels are made. Each spaced intermediate strap element has a strap section extending beyond the upper marginal edges of said panels and including releasable fastening means for attaching the intermediate strap elements to the tote bag for mounting same to the walker support. The tote bag further includes spaced outer strap elements which are attached adjacent to the opposed marginal edges of one panel and include strap portions extending beyond the upper marginal edges of the panels, the spaced outer strap elements being attached to one panel which is opposed to the panel containing the strap sections of the spaced intermediate strap elements which extend beyond the upper marginal edges of the panels. The spaced outer strap elements are capable of being attached to the walker support in a direction transverse to the spaced intermediate strap elements to maintain the front and back panels in continuously spaced relationship for opening the large compartment, and the spaced outer strap means also including releasable fastening means for attachment to the tote bag for mounting same to the walker support.

Releasable fastening means for the spaced intermediate strap elements and the spaced outer strap elements include snap closure means mounted at an outer free end of the strap section or strap portion thereof for complementary releasable fastening engagement with snap closure means attached to the same strap element from which a respective strap section or strap portion extends for attachment of the tote bag to the walker support. Preferably, each spaced intermediate strap element and each spaced outer strap element include two spaced snap closure means for releasable adjustable fastening engagement relative to snap closure means on an outer free end of an associated strap section or strap portion.

The outer spaced pocket means are formed from front and back pocket panel members which are attached to the opposed side edges and bottom edges of the front and back panels so as to be positioned in overlying relationship to corresponding front and back panels, the front and back pocket panel members having an upper margin which terminates a substantial distance from the upper marginal edges of the front and back panels, and the spaced intermediate strap elements overlie and are secured to both the front panel and front pocket panel and also separately to both the back panel and back pocket panel to provide the aforesaid outer spaced pocket means for the tote bag.

Other and further objects of the present invention will become more apparent from the ensuing description.

BRIEF DESCRIPTION OF THE DRAWINGS

In the drawings.

Corresponding reference numerals will be used throughout the various figures of the drawings.

DESCRIPTION OF THE PREFERRED EMBODIMENT

The following detail description illustrates the invention by way of example and not by way of limitation. This description will clearly enable one skilled in the art to make and use the invention, and describes several embodiments, adaptions, variations, alternatives and uses of the invention, including what I presently believe is the best mode of carrying out the invention.

Figure 1:
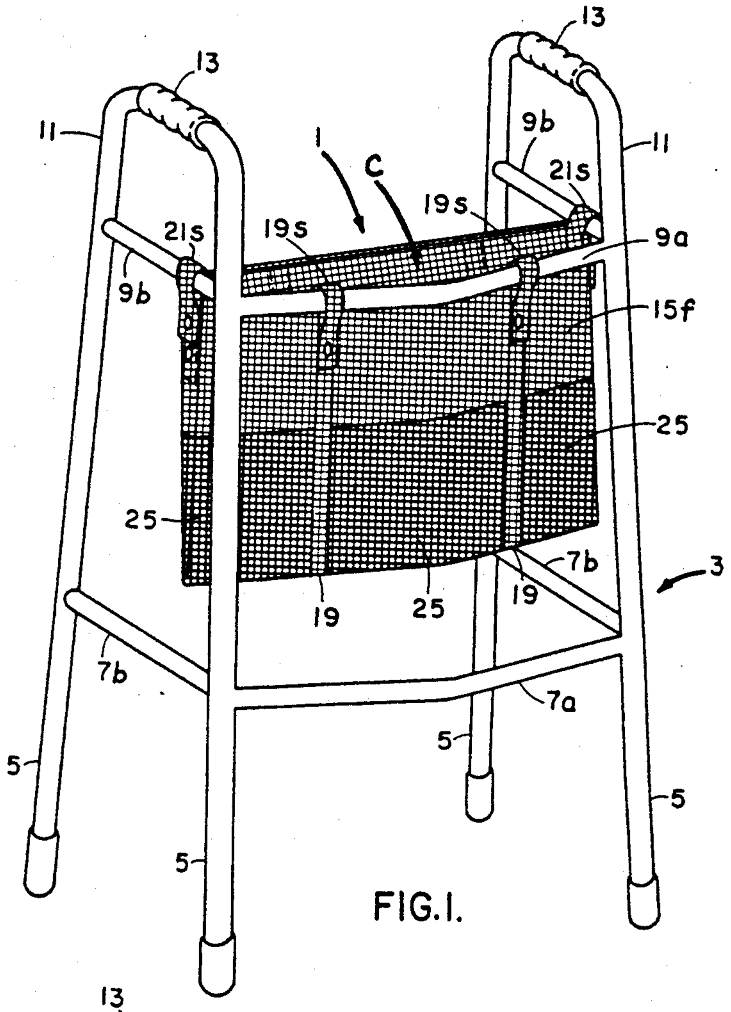
FIG. 1 is a perspective view of the tote bag constructed in accordance with the present invention and showing the manner in which the tote bag is mounted on a walker support.
Figure 2:
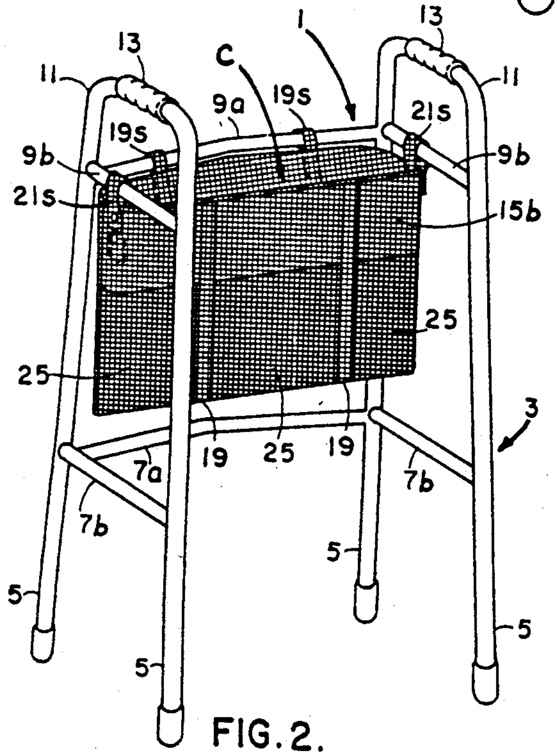
FIG. 2 is also a perspective view of the tote bag mounted on the walker support, but viewed from the back side thereof to show the large inner compartment within the tote bag.
Figure 3:
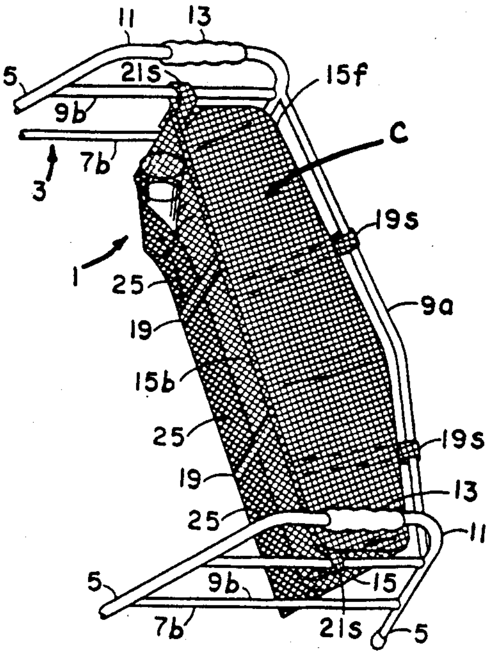
FIG. 3 is a top perspective view of the walker tote bag assembled to the walker support and further illustrating the manner in which the tote bag is mounted to the walker support as well as showing the large inner compartment thereof.

The tote bag 1 of the present invention is adapted to be mounted to a walker support 3 as shown in FIGS. 1–3 of the drawings. The walker support 3 includes four spaced, generally vertically directed legs 5 which are interconnected to one another by lower and upper interconnecting braces and bars. Specifically, lower generally horizontal interconnecting brace **7*a* and bars 7*b*, 7*b* as well as generally horizontal upper interconnecting brace 9*a* and bars 9*b*, 9*b* interconnect the four legs 5 together, but leave an opening along one side thereof, as is common, to enable the user to be positioned in close proximity to the four generally vertically directed space legs 5 of the walker support 3, as shown in FIG. 2. The upper end of the legs 5, on opposite sides thereof, includes a generally U-shaped handle 11, and handle grips 13 are mounted therein to enable a user to grip and lift the walker support 3** for balance and supported walking movement.

From the discussion that follows, it will be appreciated that the tote bag 1 of the present invention may be used with various types of walker and walker supports having various shapes and designs, with the walker support 3 shown in FIGS. 1–3 of the drawings being representative of such devices.

Figure 6:
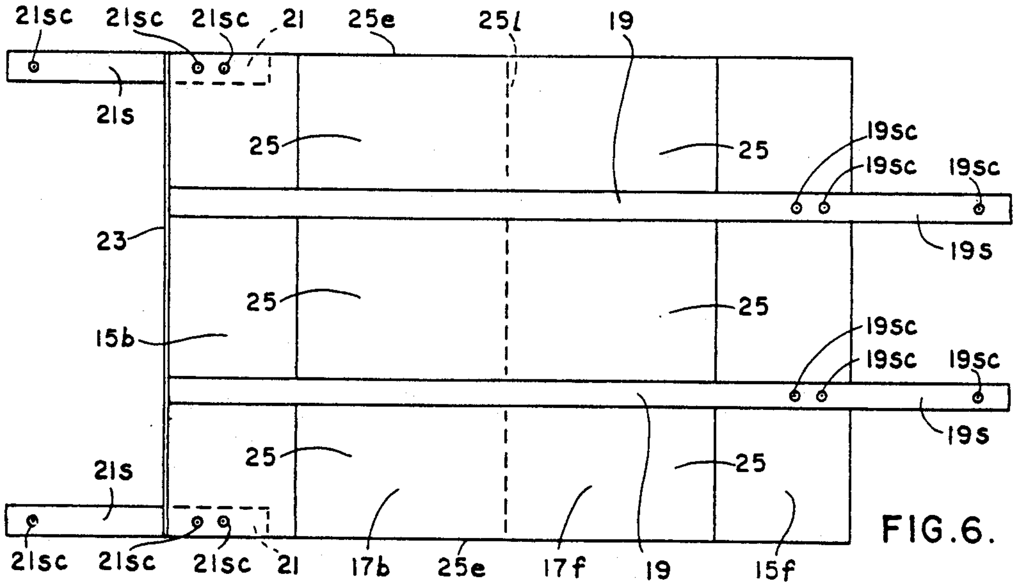
FIG. 6 is a diagrammatic top plan view of the walker support tote bag and illustrating the manner of construction thereof.
Figure 7:
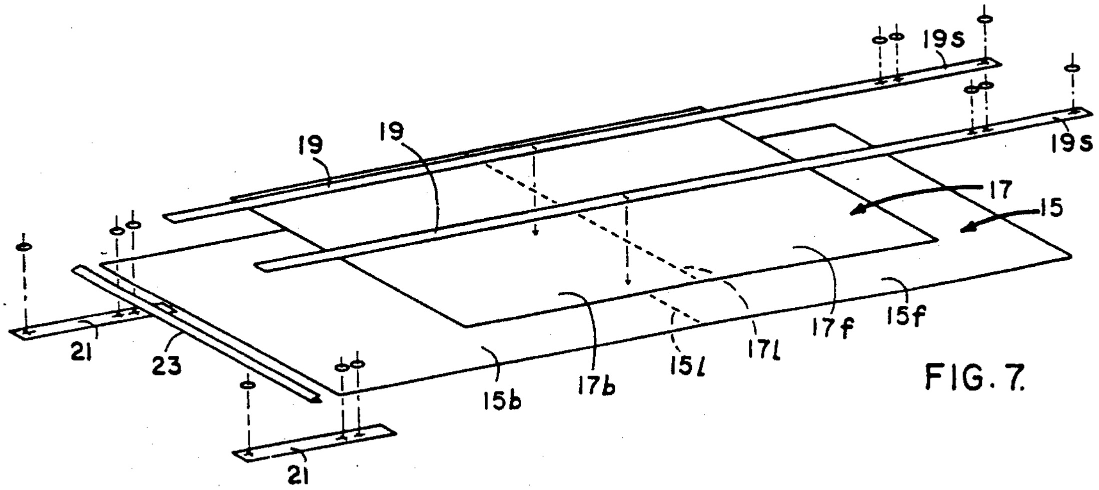
FIG. 7 is an exploded diagrammatic view of the various component parts of the walker support bag of the present invention.

In order to best understand the construction and operation of the tote bag 1 of the present invention, reference is first made to FIGS. 6–7 of the drawings which illustrate partially assembled and exploded diagrammatic views, respectively of the components of the tote bag 1. The material used in constructing the various components from which the tote bag 1 is made is preferably an open mesh textile fabric material, made of polyester or nylon, to provide a light weight, flexible, economical, clean and sanitary product. Also, the open mesh fabric allows light to show through, helping the user find items within the tote bag 1.

As shown in FIG. 7 of the drawings, a rectangularly-shaped sheet 15 of open mesh textile fabric has a fold line 151 so as to form the sheet 15 into front and back panels 15*f* and 15*b*, respectively. A second sheet 17 of open mesh textile fabric is smaller in size than the sheet 15 and includes a fold line 171 also forming front and back panels 17*f* and 17*b*. Overlying both the sheets 15 and 17 are intermediate strap elements 19, 19, while outer strap elements 21, 21 underlying only a small area of the sheet 15 at one end thereof. The aforementioned components are stitched together and includes various riveted snap closures and edging 23, as may be desired.

Figure 4:
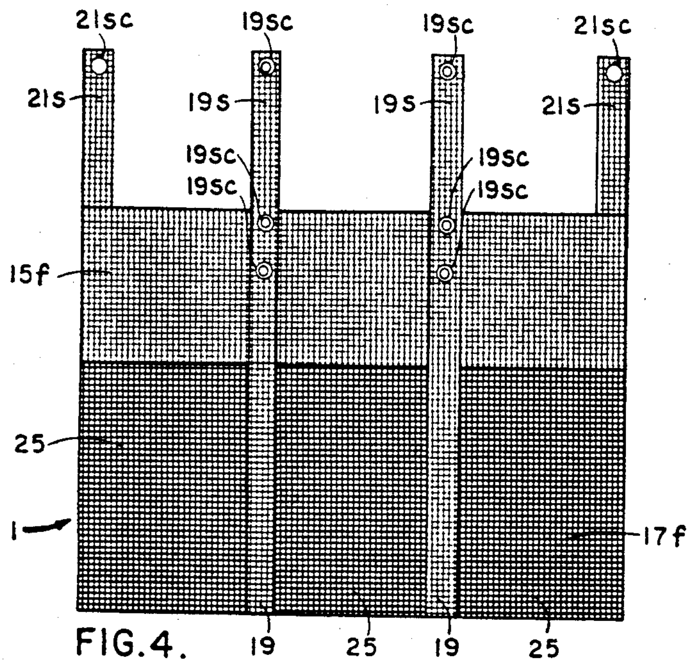
FIG. 4 is a front elevational view of the tote bag of the present invention.
Figure 5:
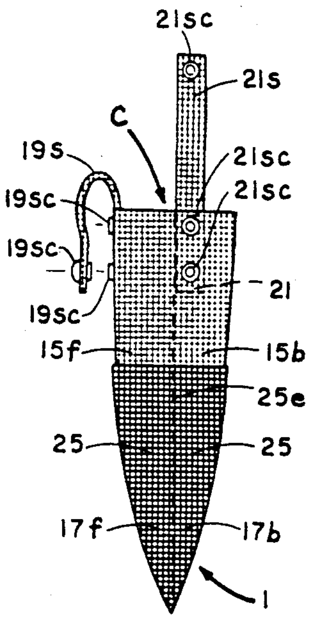
FIG. 5 is a side elevational view of the tote bag of the present invention illustrated in an opened condition.

More specifically, in reference to FIGS. 6 of the drawings, it will be seen that the sheets 15 and 17, the intermediate strap elements 19, 19 and outer strap elements 21, 21 are attached to one another as best seen in FIG. 6 of the drawings. Sheets 15 and 17 are sewn or otherwise stitched together along opposed marginal edges 25*e*, 25*e* after folding along fold line 251 into the final shape illustrated in FIGS. 4–5 of the drawings. Thus, the folded front and back panels 15*f* and 15*b*, respectively, as well as the overlying front and back pocket panels 17*f* and 17*b*, respectively, are attached to one another along the opposed marginal edges 25*e*, 25*e*, after they are folded along the fold line 251. Preferably also, the fold line 251 is also sewn or stitched in order to provide bottom marginal areas of the front and back panels 15*f*, 15*b*, respectively, as well as front and back pocket panels 17*f*, 17*b*. The sewn or stitched fold line 251 prevents objects from slipping through from front to back. Also, the one-piece construction of the sheet 15 is important in providing strength and durability to the main body of the tote bag 1 as compared to seamed front and back panels 15*f*, 15*b* which could easily split open under the weight of objects within the tote bag 1.

Prior to folding; however, the intermediate straps 19, 19 are attached to the front and back panels 15*f*, 15*b* and also to the front and back pocket panels 17*f*, 17*b* by stitching or sewing, as desired. Not only do the intermediate strap elements 19, 19 provide reinforcement and some rigidity for the front and back panels 15*f*, 15*b*, they also segregate the front and back pocket panels 17*f*, 17*b* to provide three generally equally spaced pockets 25, 25, 25 on each of the front and back pocket panels 17*f*, 17*b* respectively. It will be also be noted that the spaced intermediate strap elements 19, 19 include strap sections 19*s*, 19*s* which extend beyond the upper marginal edges of the front and back panels 15*f*, 15*b* and include releasable fastening elements for attaching the spaced intermediate strap elements to the tote bag 1 for mounting the same to the walker support 3. Preferably, the releasable fastening elements are in the form of snap closure devices mounted at the outer free end of each strap section 19*s*, 19*s* for attachment to complementary snap closures 19*sc* attached to the same spaced intermediate strap element 19*s* extends. Also, in addition to the snap closures 19*sc* mounted in an outer free end of each strap section 19*s*, each spaced intermediate strap element preferably also includes at least two spaced snap closure means 19*sc*, 19*sc* for releasable adjustable fastening engagement with the snap closure elements 19*sc* at the outer free end of an associated strap section 19*s*.

The spaced outer strap elements 21, 21 are attached to the back panels 15*b* adjacent side marginal edges 25*e*, 25*e* and also include strap portions 21*s*, 21*s* which extend beyond the upper marginal edges of the front and back panels 15*f*, 15*d* when assembled together. Each of the straps 21 further include snap closure element 21*sc* at an outer free end thereof and two complementary mating snap closure elements 21*sc*, 21*sc* for releasable adjustable fastening engagement with the snap closure element 21*sc* at the outer free end of an associated strap portion 21*s*.

When the aforementioned associated components of the tote bag 1 are assembled and secured to one another as described above, the tote bag 1 shown in FIGS. 1–5 will result. Because the front and back panels 15*f*, 15*b*, the outer peripherally spaced pockets 25, 25, 25 on each front and back panel 15*f*, 15*b* and the intermediate and outer strap elements 19, 19 and 21, 21 are all made from the open mesh textile fabric material Which is quite flexible, the tote bag 1 may be folded and collapsed in a closed position, when unattached to the walker support 3, to facilitate carrying and storage of the tote bag, as desired.

When mounted to the walker support 3, the front and back panels 15*f*, 15*b* respectively of the tote bag 1 will be spaced from one another as shown in FIGS. 1–4 of the drawings so as to provide a large inner compartment C within the tote bag for receiving a variety of articles. In this regard, note that the intermediate strap sections 19*s*, 19*s* are configured to engage the interconnecting horizontal brace 9*a* while the other strap portions 21*s*, 21*s* are configured to engage the interconnecting horizontal bars 9*b* of the walker support 3. As will be seen, the strap portions 21*s*, 21*s* stretch and open back panel 15*b* relative to the front panel 15*f* while the intermediate strap sections 19*s*, 19*s* cooperate to also space the front panel 15*f* from the back panel 15*b*. As can thus be appreciated, the various strap elements 19*s*, 19*s* and 21*s*, 21*s* that engage the connecting braces and bars of the walker support 3 are peripherally spaced about the tote bag 1 so as to cause the large compartment C thereof to be continuously maintained in an open position when mounted on the walker support. Specifically, the various strap elements 19*s*, 19*s* and 21*s*, 21*s* exert transverse forces on the tote bag in the vicinity of the upper marginal edges of the tote bag 1 for continuously maintaining the large compartment C of the tote bag 1 in an open position when mounted on the walker support 3.

The facility with which the tote bag 1 is mounted to and then detached from the walker support 3 is enhanced by the use of releasable fastening elements which may be of any type, although preferably complementary shaped snap closures of type illustrated in the drawings are preferably utilized because they can withstand the weight of heavy articles within the large compartment C and/or the outer peripherally spaced pockets 25, 25, 25 on each of the front and back panels 15*f*, 15*b*, respectively.

As further illustrated in the drawings, the sheet 17 from which the pockets 25 are formed has a different contrasting color, preferably darker in color, than the sheet 15 from which the front and back panels 15*f*, 15*b* are formed. The purpose of the different contrasting color is to enable a user to readily distinguish the pockets 25 from the front and back panel members 15*f*, 15*b*. As will be appreciated, the pockets 25, 25, 25 on each of the front and back panels 15*f*, 15*b* are in relatively close conforming relationship to the outer face of the respective front and back panels 15*f*, 15*b*. To enable a user to quickly insert his or her fingers into the open upper end of the pockets 25, the different contrasting and preferably darker color for the pockets 25, as compared to the front and back panels 15*f*, 15*b* of the tote bag 1, enables the user to quickly identify the location of the pockets 25 for insertion of different articles therein, preferably of smaller size.

The large compartment C of the tote bag 1 may be used to receive women's purses, books, magazines, newspapers and the like, while the outer peripherally spaced pockets 25 may be used to receive a liquid refreshment such as a can of soda or a glass (See FIG. 3), personal grooming articles, etc.

From the foregoing, it will be appreciated that the walker support tote bag 1 of the present invention includes a large inner compartment C for receiving a variety of articles and outer peripherally spaced pockets 25 along an outer face of the tote bag 1 for receiving articles, generally of smaller size. The outer peripherally spaced pockets 25 have a different contrasting color than the tote bag 1 to aid a user in positioning articles within the pockets. For mounting the tote bag 1 to the walker support 3, strap elements 19, 19 and 21, 21 are attached to the tote bag 1 and are configured, arranged and dimensioned relative to the tote bag 1 to cause the large inner compartment C thereof to be continuously maintained in an open position for receipt of a variety of articles therein, as well as to enable the outer peripherally spaced pockets 25 to also receive articles. When detached from the walker support, the tote bag 1, because it is made from a flexible material such as open mesh textile fabric, can be closed and collapsed, as well as folded for carrying and storage purposes, as desired.

In view of the above, it will be seen that the several objects and features of this invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

I claim:

1. A tote bag adapted to be mounted to a walker support for carrying a variety of articles, comprising:

front and back panels made of flexible material each having a substantially rectangular configuration with upper, bottom and opposed side marginal edges, said front and back panels being secured to one another along the bottom and opposed side marginal edges thereof so as to maintain said front and back panels in juxtaposition relative to one another when said tote bag is in a closed and collapsed position to facilitate carrying and storage of the tote bag;

said tote bag being manually openable along the upper marginal edges of said front and back panels to provide a large compartment within the tote bag for carrying articles; and strap means attached to said front and back panels and being configured, arranged and dimensioned relative to said tote bag for causing said front and back panels to be maintained in continuously spaced relationship from one another for storage of articles within the large compartment of the tote bag when mounted to the walker support;

said strap means including spaced intermediate strap elements attached to said front and back panels and each extending from the upper marginal edge of one panel to and through the attached bottom marginal edges of said panels to the upper marginal edge of the other panel in order to reinforce the flexible material from which the panels are made, each spaced intermediate strap element having a strap section extending beyond the upper marginal edges of said panels and including releasable fastening means for attaching said intermediate strap elements to the tote bag for mounting same to the walker support; and said strap means also including spaced outer strap elements attached adjacent to the opposed marginal edges of one panel and including strap portions extending beyond the upper marginal edges of said panels, said spaced outer strap elements being attached to said one panel which is opposed to the panel containing the strap sections of the spaced intermediate strap elements that extend beyond the upper marginal edges of said panels, said spaced outer strap elements capable of being attached to the walker support in a direction transverse to the spaced intermediate strap elements to maintain said front and back panels in continuously spaced relationship for opening said large compartment, and said spaced outer strap elements including releasable fastening means for attachment to the tote bag for mounting same to said walker support.

2. The tote bag as defined in claim 1 wherein said releasable fastening means for said spaced intermediate strap elements include snap closure means mounted at an outer free end of each strap section for complementary releasable engagement with snap closure means attached to the same spaced intermediate strap element from which a respective strap section extends for attachment to said walker support.

3. The tote bag as defined in claim 2 and including at least two spaced snap closure means mounted on each spaced intermediate strap element for releasable adjustable fastening engagement with the snap closure means at the outer free end of an associated strap section.

4. The tote bag as defined in claim 3 wherein said releasable fastening means of said spaced outer strap elements includes snap closure means mounted at an outer free end of each strap portion for complementary releasable fastening engagement to the same spaced outer strap element from which a respective strap portion extends for attachment to said walker support.

5. The tote bag as defined in claim 4 and including at least two spaced snap closure means mounted on each spaced outer strap element for releasable adjustable fastening engagement with the snap closure means at the outer free end of an associated strap portion.

6. The tote bag as defined in claim 5 and including outer spaced pocket means mounted on an outside face of each of said front and back panels also for receiving articles therein.

7. The tote bag as defined in claim 6 wherein said outer spaced pocket means are made from a different contrasting color than said front and back panels.

8. The tote bag as defined in claim 7 wherein said outer spaced pocket means is formed from front and back pocket panel members which are attached to the opposed side edges and bottom edges of said front and back panels so as to be positioned in overlying relationship to corresponding front and back panels, said front and back pocket panel members having an upper margin which terminates a substantial distance from the upper marginal edges of said front and back panels, and said strap means including spaced intermediate strap elements which overlie and are secured to both said front panel and front pocket panel and also separately to both said back panel and back pocket panel to provide said aforesaid outer spaced pocket means for said tote bag.

* * * * *